No. 769,526.                                                         Patented September 6, 1904.

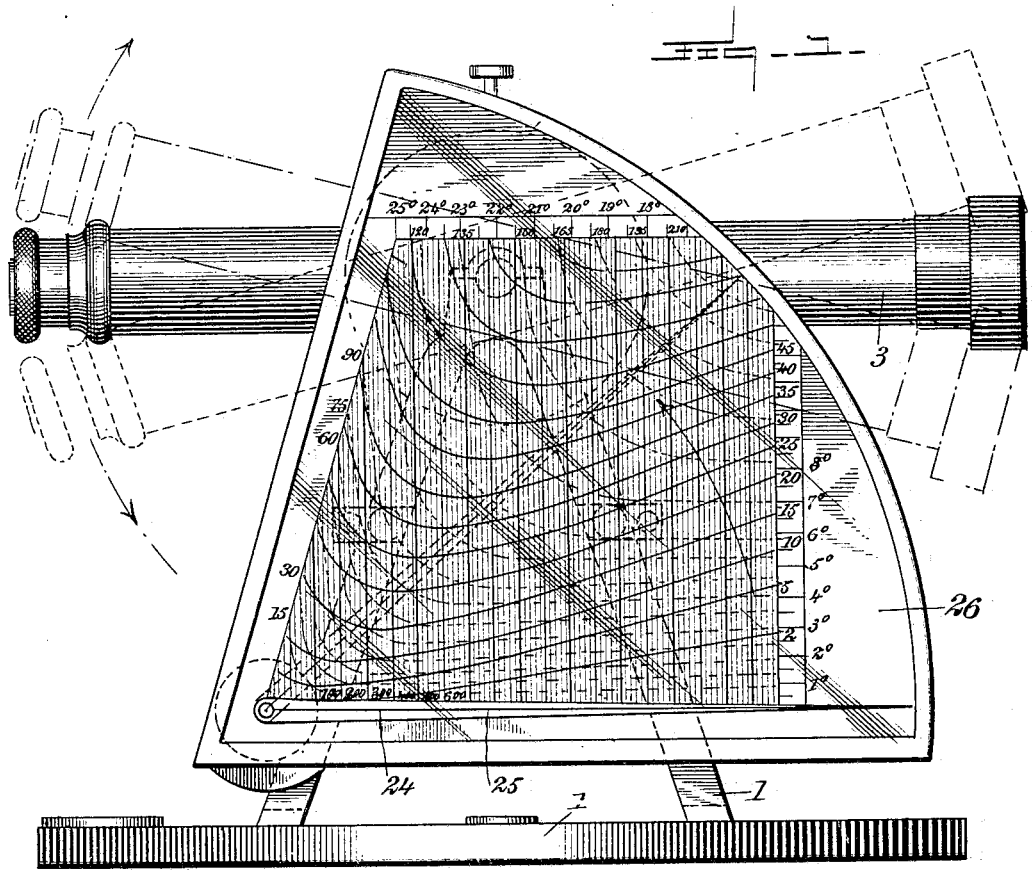

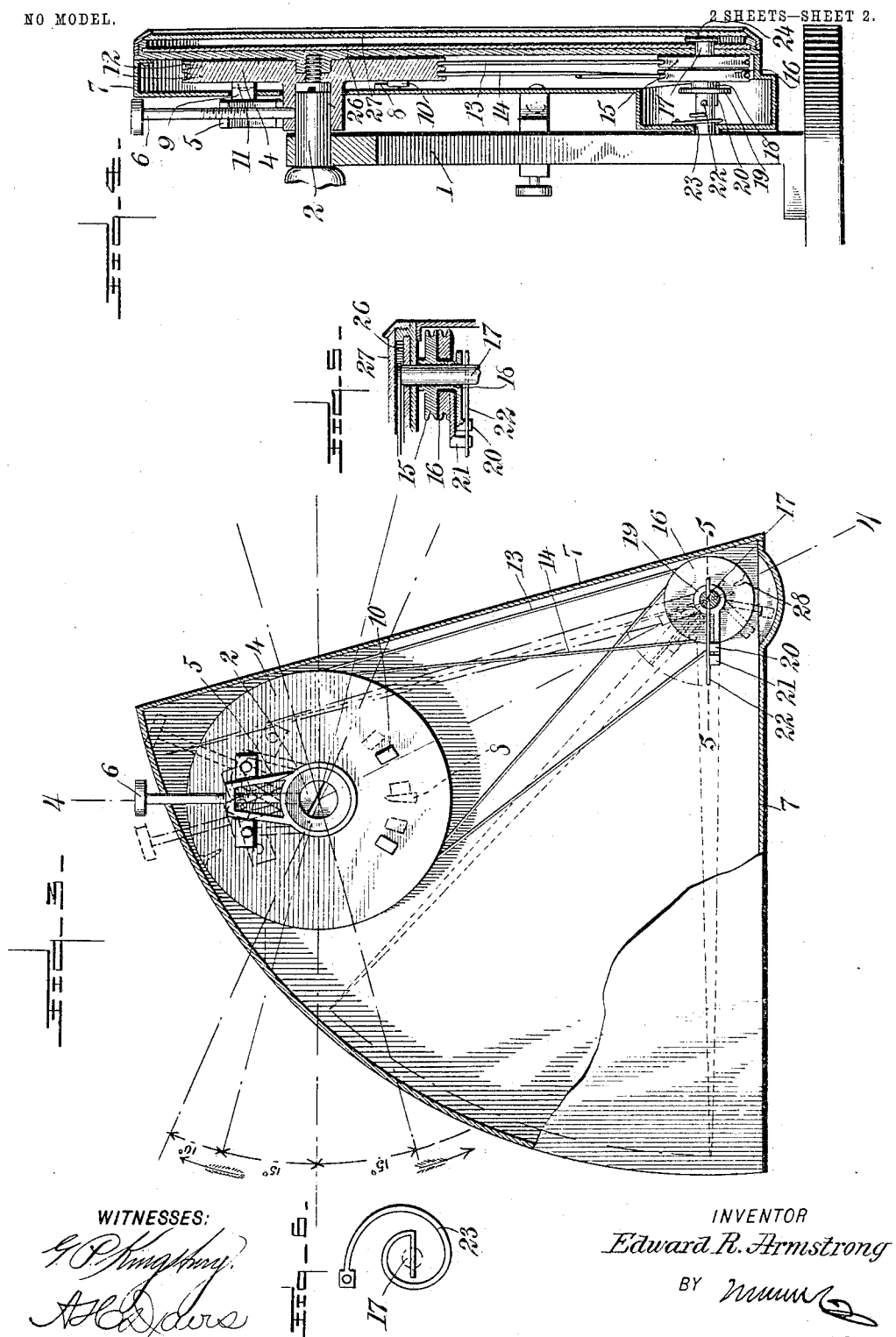

UNITED STATES PATENT OFFICE.

EDWARD R. ARMSTRONG, OF BEAUMONT, TEXAS.

ATTACHMENT FOR SURVEYING INSTRUMENTS.

SPECIFICATION forming part of Letters Patent No. 769,526, dated September 6, 1904.

Application filed February 18, 1904. Serial No. 194,121. (No model.)

*To all whom it may concern:*

Be it known that I, EDWARD R. ARMSTRONG, a citizen of the United States, and a resident of Beaumont, in the county of Jefferson and State of Texas, have invented a new and Improved Attachment for Surveying Instruments, of which the following is a full, clear, and exact description.

My invention relates to surveying and other instruments of a kindred character in which a telescope is used to aid in measuring distances and angles.

The objects of my invention are to provide an ordinary surveyor's transit or other like instrument with a chart which will indicate angles and distances in a manner to be explained hereinafter and to connect the telescope with this chart in such a manner that the desired data may be read directly from the chart by means of an indicator. In stadia-rod work the telescope is provided with a pair of horizontal cross-hairs, by means of which distances may be read directly upon the stadia-rod. These distances, however, have to be corrected for the angle at which the telescope is inclined in reading them, and it is impossible to make these corrections at present without the use of tables or calculations, which also have to be used in finding the altitudes observed.

It is the principal object of my invention to provide for reading all of these data directly from the instrument, and thus avoid all the ordinary calculations, which usually have to be made at night after fieldwork is rendered impossible by the darkness.

Reference is to be had to the accompanying drawings, forming a part of this specification, in which similar characters of reference indicate corresponding parts in all the figures.

Figure 1 is a side elevation of a surveyor's transit with one form of my invention applied. Fig. 2 is a perspective view of a detail. Fig. 3 is a sectional view of the back of the apparatus with the telescope removed. Fig. 4 is a sectional view of the apparatus on the line 4 4 of Fig. 3. Fig. 5 is a fragmentary sectional view of certain details, taken on the line 5 5 of Fig. 3; and Fig. 6 is a view of a detail.

In the drawings, 1 represents a base or standard for supporting a shaft 2, carrying a telescope 3 of ordinary construction. Upon the shaft 2 is mounted a pulley 4, which may be fixed to the shaft by means of a bracket 5 and screw 6, as clearly shown in Figs. 3 and 4. 7 is a casing surrounding the pulley 4 and extending downwardly, as shown. Upon this casing is a lug 8, and upon the bracket 5 is a lug 9, which lugs are adapted to come in contact with lugs 10 and 11, respectively, on the pulley 4 for the purpose of limiting the rotation of the pulley and the other devices connected thereto. The pulley is provided with two parallel grooves 12, in which run a couple of belts 13 14, one of which is crossed, as shown. These belts are adapted to drive in opposite directions pulleys 15 and 16, loosely mounted upon a shaft 17. The pulley 15 is provided with a sleeve 18, which projects through the pulley 16 and forms a bearing therefor and has a collar 19 at its end. On the collar 19 is secured a lug 20, for a purpose to be described.

Attached to the pulley 16 is a similar lug 21, formed at a greater distance from the center of the shaft 17 than the lug 20, so that it may rotate around it. Rigidly attached to the shaft 17 is a lever-arm 22, which is adapted to be driven by the lugs 20 and 21, as will be shown later. The shaft 17 is connected to the casing 7 by means of a spring 23, adapted to cause its rotation in one direction. Upon the other end of the shaft 17 is attached an indicator 24, which is preferably made of a transparent material, as glass, and is provided with a line 25 extending along its center from end to end. This indicating-arm may be formed of a plate having a longitudinal opening extending nearly the whole length thereof and provided with a fine wire or other indicating-line along its center from end to end. By the use of either form of indicating-arm the indicating-line can be used throughout its whole length. Directly under this arm and upon the outer face of the casing 7 is placed a chart 26, which is preferably covered with a glass or other transparent protecting-covering 27. The belts 13 14 are secured to the pulleys in any desired way, as by the screws 28. This chart is made as follows: The vertical lines numbered "100," "200," "300," &c., indicate the distances read upon the stadia-rod in feet, meters, or any other unit of measurement. The scale running up the right-hand side and across the top indicates the angles through which the telescope is turned. It will be noted that these angles, as shown in the drawings, are three times the actual angles represented by the characters "1°," "2°," "3°," &c., which are provided for by the system of belts and pulleys referred to. The curved dotted lines, which are represented by the numerals "90," "120," "135," "150," &c., along the left-hand and upper edge of the chart represent altitudes corresponding to the various distances and angles included on the chart. The full curved lines represented by "—2," "—5," "—10," &c., at the right indicate the distances to be deducted from the stadia-reading on account of the inclination of the telescope. These two series of curved lines are carefully calculated in such a manner that for any position of the indicator, as shown by dotted lines in Fig. 1, the angle through which the telescope has been turned from the horizontal is easily read, and upon taking the stadia-reading and following the vertical line representing it up to the point at which it intersects the central line of the indicating-arm the altitude and the error in the stadia-reading can be directly read from these two series of curved lines. It will be obvious that it is not necessary that the rod-reading lines be straight and the other lines curved, but that it is within the scope of my invention to make the rod-reading lines curved and the elevation-lines straight, the former way having been illustrated for convenience and to avoid confusion. After they have been calculated the lines may be drawn in any way that will afford a convenient and clear chart, preferably starting with certain ones straight; but they may all be curved, if desired. The operation of the device to secure this result may now be described. In the first place the two lugs 20 and 21 must be brought to the position shown in Fig. 5, directly under the lever-arm 22, which may be placed in a horizontal position and the telescope likewise turned to a horizontal position. Now if the telescope is turned in either direction the two pulleys 15 and 16, and consequently the two lugs 20 and 21, will be turned in opposite directions. The one of these lugs which is turned upwardly by this motion will cause the lever-arm 22, and consequently the shaft 17, to be rotated in such a manner that the indicating-arm 24 will swing about its pivot upwardly from the horizontal position which it necessarily assumed when the lever-arm was placed in a horizontal position. It will be seen that it makes no difference which of these arms move upwardly. Such motion of either one of them will cause this motion of the lever-arm. Consequently negative angles are measured in the same way as positive angles and a chart for only one is required. The spring 23 will operate to reverse the motion of the shaft 17 and bring the indicating-arm back to a horizontal position when the telescope is turned back to horizontal; but such motion of the telescope will not directly cause the shaft 17 to be rotated. The lugs 8, 9, 10, and 11, which have been referred to, prevent the turning of the pulley 4 after the lugs come in contact with each other, and any further turning of the telescope must be permitted only by the slipping of the clamping devices 5 6 on the shaft 2. These clamping devices are intended to be set at such positions as to stop the turning of the telescope when the indicating-arm reaches the end of the chart—that is, as shown in the present instance, twenty-five degrees. It will be obvious, however, that charts may be made for any number of degrees, if desired.

Owing to the difference in size of the pulleys 4 and 15 and 16, the indicator-arm will be rotated through a larger angle with the telescope, in the present instance through an angle of three times the size. The chart of course is constructed with this in view, and the angles marked on the scale at the right and top of the chart are not the actual angles passed through by the indicating-arm, but are those passed through by the telescope itself.

It will be obvious that any other means of transmitting motion from the shaft 2 to the indicating-arm 24 may be used and many other modifications of the form illustrated may be made without departing from the spirit of my invention as indicated in the claims, and I do not wish to confine myself to the specific form shown.

Having thus described my invention, I claim as new and desire to secure by Letters Patent—

1. In a surveying instrument, the combination of a telescope, an indicating-arm, connections from said telescope to said arm for transmitting motion from the telescope to the arm and moving said arm, means for arresting the motion of said arm at certain limits, and means for supporting a chart.

2. In a surveying instrument, the combination of a telescope, an indicating-arm, connections from said telescope to said arm for transmitting motion from the telescope to the arm and moving the arm in one direction independently of the motion of the telescope, and means for supporting a chart.

3. In a surveying instrument, the combination of a telescope, an indicating-arm, connections from said telescope to said arm for transmitting motion from the telescope to the arm and moving said arm in one direction independently of the direction of motion of the telescope, yielding means for returning the arm to its original position, and means for supporting a chart.

4. In a surveying instrument, the combination of a telescope, an indicating-arm, connections from said telescope to said arm for transmitting motion from the telescope to the arm, a yielding device for returning said arm to its original position, and means for supporting a chart in proximity to said arm.

5. In a transit, the combination of a shaft, an indicating-arm mounted thereon, a pulley loosely mounted on said shaft, means for transmitting motion to said pulley, a lever-arm fixed to said shaft, a projection connected to said pulley and adapted to come into contact with said arm to operate it, and means for supporting a chart in proximity to said arm.

6. In a transit, the combination of a pivoted telescope, a shaft, a pair of pulleys loosely mounted on said shaft, means for transmitting motion from said telescope to said pulleys, a lever-arm secured to said shaft, means for transmitting motion from said pulleys to said arm, an indicating-arm on said shaft, and means for supporting a chart in proximity to said arm.

7. In a transit, the combination of a pivoted telescope, a shaft, a pair of pulleys loosely mounted on said shaft, means for transmitting motion from said telescope to said pulleys, a lever-arm secured to said shaft, means for transmitting motion from said pulleys to said arm in one direction only, an indicating-arm on said shaft, and means for supporting a chart in proximity to said indicating-arm.

8. In a surveying instrument, the combination of a chart provided with lines indicating angles and distances, an indicating-arm, a telescope, connections from said telescope to said arm for transmitting motion of the telescope to the arm and moving said arm over the surface of said chart, and means for arresting the motion of said arm at a certain limit.

9. In a surveying instrument, the combination of a chart provided with lines indicating angles and distances, an indicating-arm, a telescope, and connections from said telescope to said arm for transmitting motion of the telescope to the arm and moving said arm over the surface of said chart in one direction independently of the direction of motion of the telescope.

10. In a surveying instrument, the combination of a chart provided with lines indicating angles and distances, an indicating-arm, a telescope, connections from said telescope to said arm for transmitting motion of the telescope to the arm and moving said arm over the surface of said chart in one direction independently of the direction of motion of the telescope, and yielding means for returning said arm to its original position.

11. In a surveying instrument, the combination of a chart provided with lines indicating angles and distances, an indicating-arm, a telescope, connections from said telescope to said arm for transmitting motion of the telescope to the arm and moving said arm over the surface of said chart, and a yielding device for returning said arm to its original position.

12. In a transit, the combination of a chart provided with lines indicating distances, an indicating-arm pivoted at the zero-point of said chart, a shaft carrying said arm, a pulley loosely mounted on said shaft, means for transmitting motion to said pulley, a lever-arm fixed to said shaft, and a projection connected to said pulley and adapted to come into contact with said arm to operate it.

13. In a transit, the combination of a pivoted telescope, a shaft, a pair of pulleys loosely mounted on said shaft, means for transmitting motion from said telescope to said pulleys, a lever-arm secured to said shaft, means for transmitting motion from said pulleys to said arm, an indicating-arm on said shaft, and a chart provided with means for indicating distances.

14. In a transit, the combination of a pivoted telescope, a shaft, a pair of pulleys loosely mounted on said shaft, means for transmitting motion from said telescope to said pulleys, a lever-arm secured to said shaft, means for transmitting motion from said pulleys to said arm in one direction only, an indicating-arm on said shaft, and a chart provided with means for indicating distances.

15. In a transit, the combination of a pivoted telescope, a pulley connected thereto, a shaft having a lever-arm secured thereto, two pulleys loosely mounted on said shaft, means for transmitting motion from the first-named pulley to the other two pulleys to rotate them in opposite directions, and a projection connected to each of said loose pulleys adapted to coact with said lever-arm to rotate the shaft.

16. In a transit, the combination of a pivoted telescope, a pulley connected thereto, a shaft having a lever-arm secured thereto, two pulleys loosely mounted on said shaft, means for transmitting motion from the first-named pulley to the other two pulleys to rotate them in opposite directions, a projection connected to each of said loose pulleys adapted to coact with said lever-arm to rotate the shaft in one direction only, and a yielding device for moving the said shaft in the opposite direction.

17. The combination of a chart, provided with a plurality of series of lines indicating angles and distances, an indicating-arm pivoted thereto at the zero-point, a telescope, and connections from said telescope to said arm for moving the arm over the surface of the chart.

18. The combination of a chart provided with a plurality of straight and curved lines indicating distances, and a scale indicating angles, with an indicating-arm pivoted thereto, and means for moving said arm over the surface of the chart.

19. The combination of a chart provided with a plurality of straight and curved lines indicating distances, and a scale indicating angles, with an indicating-arm pivoted thereto, and means for moving said arm over the surface of the chart, the angles indicated by said scale bearing a certain constant ratio to the angle actually existing between the arm at any position and the zero-line of the scale.

20. The combination of a chart provided with a series of lines indicating distances, a series of lines indicating altitudes, and a scale indicating angles, with a movable indicating-arm.

21. The combination of a chart provided with a series of lines indicating horizontal distances, and two series of lines indicating vertical distances, with an indicating-arm.

22. The combination in a chart, of a series of lines indicating horizontal distances, a series of lines indicating altitudes, and a series of lines indicating errors in stadia-readings due to inclination.

23. The combination in a chart, of a series of straight lines indicating horizontal distances, a series of curved lines indicating altitudes, a series of curved lines indicating errors in stadia-readings, and a scale indicating angles.

In testimony whereof I have signed my name to this specification in the presence of two subscribing witnesses.

EDWARD R. ARMSTRONG.

Witnesses:
L. M. HOGE,
J. C. SIMCOX.